INVENTOR
SHIGERU TAKAHASHI
BY: Paul M. Craig, Jr.
ATTORNEY

INVENTOR
SHIGERU TAKAHASHI
BY: Paul M. Craig, Jr.
ATTORNEY

INVENTOR
SHIGERU TAKAHASHI
BY Paul M. Craig, Jr.
ATTORNEY

INVENTOR
SHIGERU TAKAHASHI
BY: Paul M. Craig, Jr.
ATTORNEY

United States Patent Office 3,284,781
Patented Nov. 8, 1966

3,284,781

SEMI-PERMANENT MEMORY DEVICE

Shigeru Takahashi, Tokyo, Japan, assignor to Hitachi, Ltd., Tokyo, Japan, a corporation of Japan Filed July 8, 1963, Ser. No. 293,336
Claims priority, application Japan, July 10, 1962, 37/28,308
2 Claims. (Cl. 340—173)

The present invention relates to a memory device which can store semi-fixed programs or data required in an electronic digital computer.

Heretofore magnetic drums, ferrites, core matrices have been used for memory devices in a digital computer and these are characterized by the fact that their contents are read and written at will under the control of the main part of the computer. However, it has been found that among the programs and data required by the computer these are a considerable number of those which are not necessary to be or even must not be rewritten.

It is an object of the present invention to provide a semi-fixed memory device, which is economical, fast-operating and reliable, for storing information which is not necessary to be or must not be rewritten.

Figure 1:
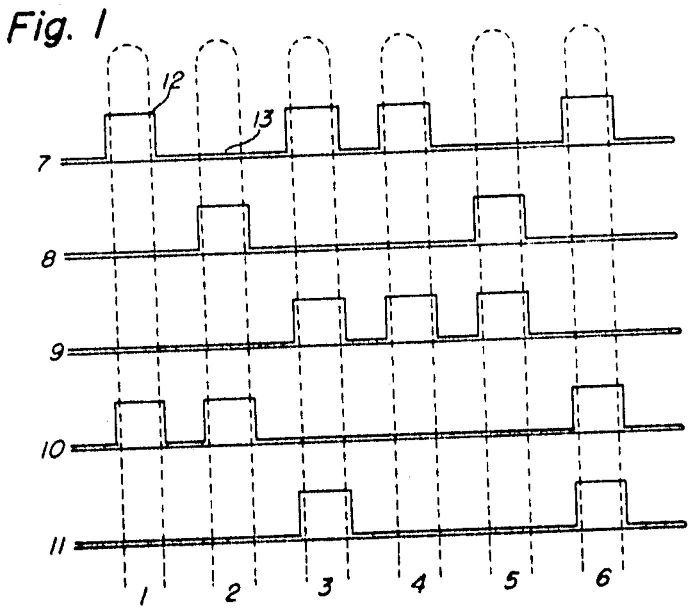
Figure 2:
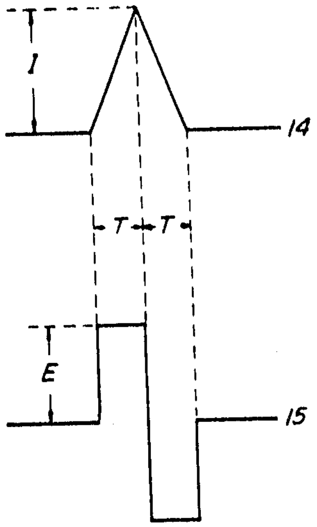
Figure 3A:
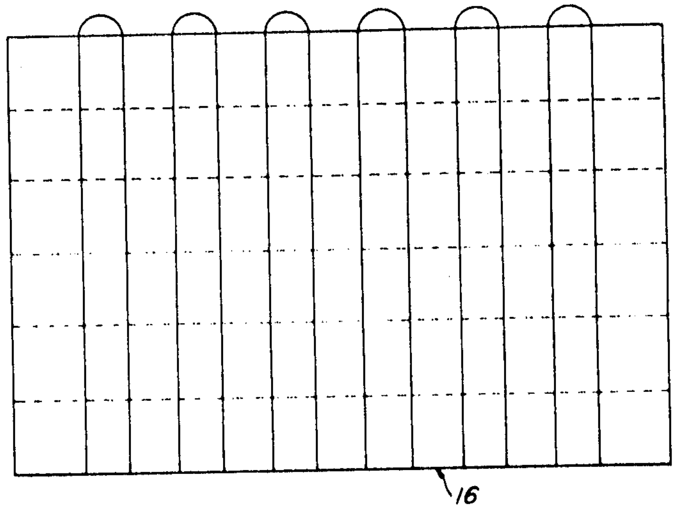
Figure 4:
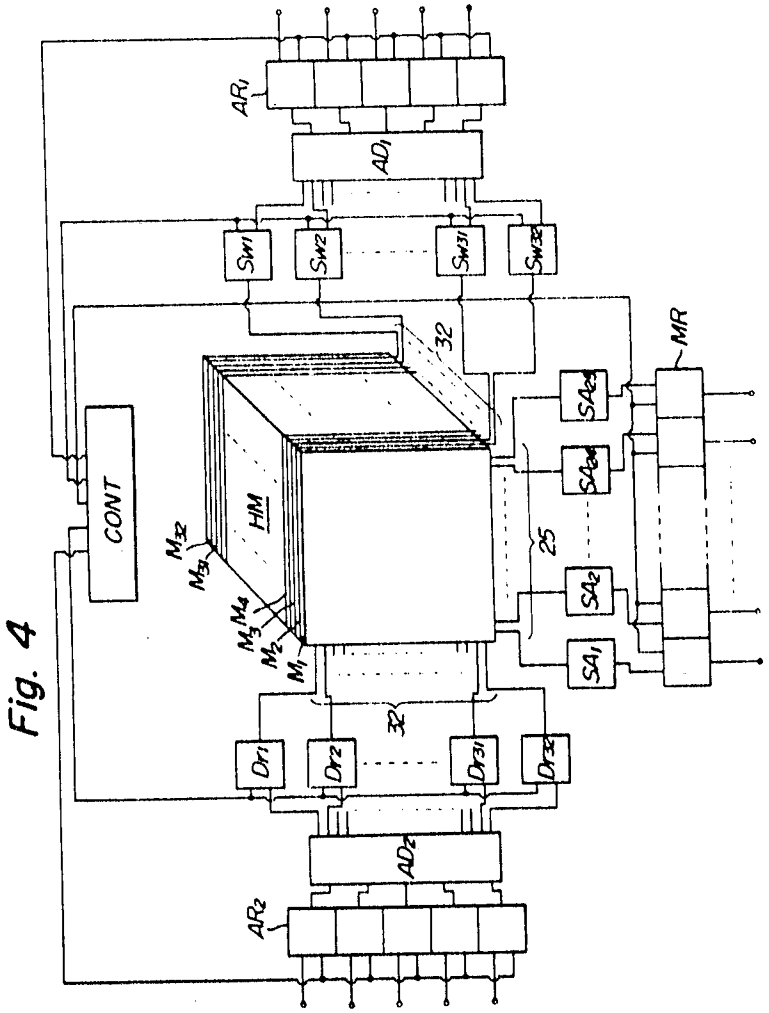
Figure 5:
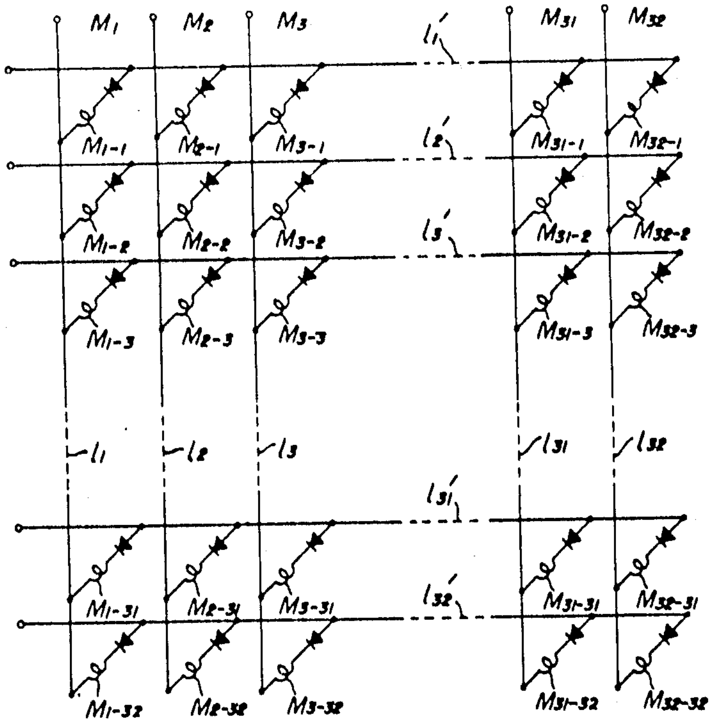

This and other objects and advantages of the present invention will more fully appear from the following description made in conjunction with the accompanying drawings, and in which:

FIG. 1 is a basic explanatory diagram of the present invention; FIG. 2 is a similar diagram of wave-forms of a driving current and a read voltage, FIGS. 3*a* and *b* are views illustrating the structure of a unit memory board; FIG. 4 is a block diagram of an embodiment according to the present invention; and FIG. 5 is a circuit diagram of a part of the embodiment shown in FIG. 4.

Referring to FIG. 1 illustrating the basic principle of the present invention, digit lines 1 to 6 represented by dotted lines are insulated from and disposed adjacent to word driving lines 7 to 11 represented by solid lines. In each intersecting portion of these two kinds of lines are to be stored a bit of information. More specifically, information "1" may be stored by being provided with a loop as shown at 12 in FIG. 1 at a portion of one of the word driving lines and arranging opposite sides of the loop in parallel relation to one of the digit lines, and information "0" may be stored by being provided with no loop and making one of the digit lines and one of the word driving lines to intersect normally as shown at 13 in FIG. 1.

When the sides of the loop which are parallel with the digit line are L cm. in length, the distance between the digit and the word driving lines in the direction normal to a plane including the digit or the word driving lines is *d* cm., the spacing of the adjacent digit lines is D cm., and the span of the loop is assumed to be equal to the spacing of the digit lines, mutual inductance of $$M=[ZL\ \log_e\ (D/d)]\times 10^{-9}\ \text{henries}$$

is produced between one of the word driving lines and one of the digit lines by provision of the loop, but mutual inductance between merely crossing lines such as the word driving line 7 and the digit line 2 is zero. Referring to FIG. 2 illustrating a basic explanatory diagram of wave forms of a driving current and a read-out voltage in the memory circuit according to the present invention, a driving current supplied to one of the word driving lines is represented by a line 14 and a read-out voltage across the appropriate ends of one of the digit lines is represented by a line 15. Thus when a current pulse varying from 0 to 1 during a time T and from 1 to 0 during a succeeding time T is supplied to the word driving line, a read-out voltage of $$E=MI/T\ \text{volts}$$

may be obtained on the digit line having mutual inductance of M with the word driving line. For example, when the current pulse shown at 14 in FIG. 2 is applied to the word driving line 7 in FIG. 1, voltage variation as shown at 15 in FIG. 2 is produced on the digit lines 1, 3, 4 and 6 but not on the digit lines 2 and 5. Thus it will be seen that 1, 0, 1, 1, 0 and 1 may be read out on the digit lines 1, 2, 3, 4, 5 and 6, respectively, and these have been stored semi-fixedly by providing previously with the above mentioned loops at the portions corresponding to the information "1." Similarly, information 0, 1, 0, 0, 1 and 0 may be obtained by driving the word driving line 8, and such circumstance is similar for all of the other word driving lines.

Although in FIG. 1 there is illustrated the case of storing five words with six bits for a word, the exactly same principle may apply for the case of storing a desired number of bits or words.

Figure 3B:
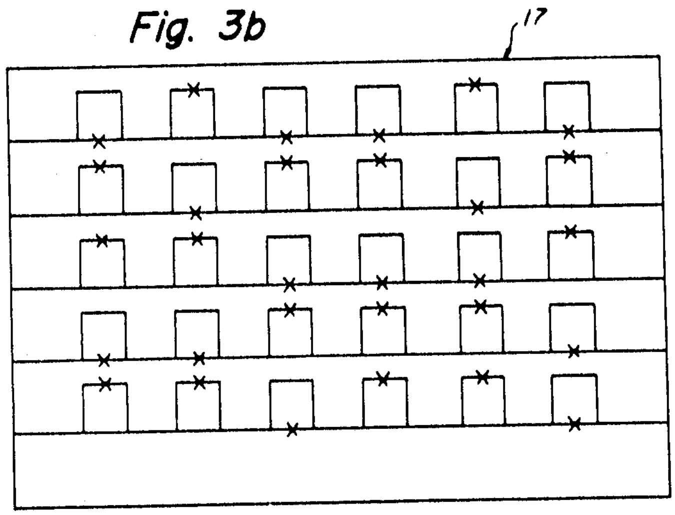

An embodiment according to the present invention is illustrated in FIG. 3 wherein a printed wiring board 16 has a group of the printed word driving lines as shown in dotted lines on its back face and the digit lines as shown in full lines on its front face, and another printed wiring board 17 has another group of the printed word driving lines as shown in full lines on its front face. For information "1" conductors short-circuiting the loops and for information "0" conductors forming the loops may be cut, respectively. By superimposing the printed wiring board 17 in registered relation over the printed wiring board 16 and connecting externally the corresponding word driving lines with one another, semi-fixed memory device according to the above mentioned principle may be constructed easily and very economically.

The cuts shown by cross marks (*x*) in the printed wiring board 17 are arranged in order to store information corresponding to those shown in FIG. 1. Preferably a plate of 0.1∼0.2 mm. in thickness is employed for the printed wiring board 17 and cuttings of the conductors are conveniently accomplished by perforating in the appropriate portions. Although cuttings of the portions forming the loops corresponding to information "0" are not necessarily needed, they are effective to reduce the load of the digit lines and to check the writing by perforation in the corresponding portion to either information "1" or "0."

If the thickness of the printed wiring board 17 is taken as 0.2 mm., the length of the sides of the loops parallel to the digit lines as 4 mm., and the breadths of the digit lines and of the loops as 2 mm., the above mentioned mutual inductance will be $1.8\times 10^{-9}$ henries. Taking $I=200$ milliamperes and $T=0.1$ µsec. in the waveform of current represented by the line 14 in FIG. 2, a peak value *m* of the output voltage represented by the line 15 in the figure will be approximately 3.6 millivolts and it can be easily amplified by conventional transistors.

FIG. 4 shows an embodiment according to the present invention. The semi-fixed memory device HM is composed of a stack of 32 sheets of unit memory boards, each of which is formed by assembling the printed wiring board 16 shown in FIG. 3*a* and that 17 shown in FIG. 3*b* in superposed relation. Between the respective memory boards $M_1$, $M_2$, . . . $M_{32}$, are disposed shielding means such as magnetic shielding plates, for the purpose of prevention of noise due to electromagnetic induction between the unit memory boards $M_1$, $M_2$, . . . $M_{32}$ during reading-out, but these magnetic shielding plates are not shown in the figure for simpilicity. Each of the unit memory boards $M_1$, $M_2$, . . . $M_{32}$ has 25 printed digit lines arranged in transverse direction, viewed in the FIG. 4, as shown by the printed board 16 in FIG. 3*a* and 32 printed word driving lines arranged in longitudinal direction, viewed in the FIG. 4, as shown by the printed board 17 in FIG. 3*b*. These word driving lines are formed with the loops in the positions where they intersect the digit lines and information "0" and "1" is recorded by cutting the upper and lower sides, respectively, as described previously.

With the arrangement pointed above, each of the unit memory board $M_1$, $M_2$, . . . $M_{32}$ will be of memory capacity of 32 words as its each line is of information storing capacity of 25 bits, with these bits representing a word. Accordingly, the semi-fixed memory device HM is of capacity of 1,024 words.

The word driving lines in each of the unit memory boards $M_1$, $M_2$, . . . $M_{32}$ are connected as shown in FIG. 5, externally of the board. In the figure, each of the word driving lines provided in each of the unit memory boards $M_1$, $M_2$, . . . $M_{32}$ is shown in the form of a coil. There is a complete set of 1,024 such word driving lines. The word driving lines distributed in each longitudinal row in FIG. 5 belong to the same unit memory board. For example, the word driving lines $M_{1-1}$, $M_{1-2}$, . . . $M_{1-31}$ and $M_{1-32}$ in the first longitudinal row are to be arranged on the unit memory board M and the word driving lines $M_{3-1}$, $M_{3-2}$, . . . $M_{3-31}$ and $M_{3-32}$ in the third longitudinal row are to be arranged on the unit memory board $M_3$. Remaining word driving lines in various longitudinal row are to be arranged similarly and represented with the similar notations.

One end terminal of each of the word driving lines in each of the unit memory boards $M_1$, $M_2$, . . . $M_{32}$ is connected to one of the conductors $l_1$, $l_2$, . . . $l_{32}$, each of which is common to one of the rows of the unit memory boards, while the other end terminal is connected through a diode to one of conductors $l_1'$, $l_2'$, . . . $l_{25}'$, each of which is common to one of the transverse line arrangements of the unit memory boards. For example, one end terminal of each of the word driving lines $M_{2-1}$, $M_{2-2}$, . . . $M_{2-31}$ and $M_{2-32}$ of the unit memory board $M_2$ in the second longitudinal row is connected in common to the conductor $l_2$ and the other end terminal of each of the word driving lines $M_{1-2}$, $M_{2-2}$, . . . $M_{31-2}$ and $M_{32-2}$ in the second line is connected through diode to the common conductor $l_2$. For each of the remaining transverse lines and longitudinal rows connections are made in the same manner.

The thirty-two conductors $l_1$, $l_2$, . . . $l_{32}$ extending in longitudinal direction in FIG. 5 are connected to the same number of switching circuits $Sw_1$, $Sw_{21}$ . . . $Sw_{32}$, respectively, in FIG. 4, and the thirty-two conductors $l_1'$, $l_2'$, . . . $l_{32}'$ extending in transverse direction in FIG. 5 are connected to the same number of driving circuits $Dr_1$, $Dr_2$, . . . $Dr_{31}$ and $Dr_{32}$, respectively, all of them being so arranged that at an instant any desired word driving line may be selectively driven.

Some parts in FIG. 4 corresponding to those in FIG. 5 are not illustrated for simplicity. It may be considered that in FIG. 4 the switching circuits $Sw_1$, $Sw_2$, . . . $Sw_{32}$ effect to select the corresponding unit memory boards $M_1$, $M_2$, . . . $M_{32}$, respectively and the driving circuits $Dr_1$, $Dr_2$, . . . $Dr_{32}$ operate to drive the word driving lines of the selected one of the unit memory boards.

The digit lines in each of the unit memory boards $M_1$, $M_2$, . . . $M_{32}$ of the semi-fixed memory device HM are connected in series for each longitudinal row. For example, the digit line in the first row of the unit memory board $M_1$ is connected in series to the digit line in the first row of the unit memory board $M_2$, and this digit line is in turn connected in series to the digit line in the first row of the unit memory board $M_3$. Thus the digit lines in the first rows of the remaining unit memory boards $M_4 \sim M_{32}$ are connected in series with each other. Output terminals of this row are drawn from the beginning end of the digit line of the first unit memory board $M_1$ and the terminal end of the digit line of the thirty second unit memory board $M_{32}$. The digit line from the second to the twenty-fifth rows are connected as explained above, and output terminals of them are also drawn in the same fashion. The output terminals of these rows are connected through respective conductors to input terminals of reading amplifiers $SA_1$, $SA_2$, . . . $SA_{25}$, respectively, each of which being provided for one of the rows. Each of these reading amplifiers is used in common for a set of digit lines in each row.

The switching circuits $Sw_1$, $Sw_2$, . . . $Sw_{32}$ are connected through an address decoder AD1 to an address register AR1 being of capacity of five bits. The driving circuits $Dr_1$, $Dr_2$, . . . $Dr_{32}$ are also connected through another address decoder AD2 to an address register AR2. Each of the address registers AR1 and AR2 has an input terminal for receiving address information. The reading amplifiers $SA_1$, $SA_2$, . . . $SA_{25}$ are connected to a memory register MR being of capacity of 25 bits. The memory register MR includes an output terminal for feeding the read information from the semi-fixed memory device HM.

All of the switching circuits Sw's, the driving circuits Dr's, the address registers AR1 and AR2 and the memory registers MR are connected to a control circuit for controlling their operations.

Operation of the whole system shown in FIG. 4 will be now described briefly. Address information from a computer are fed to the address registers AR1 and AR2 and then through the address decoders AD1 and AD2 to effect a selection of the switching circuits Sw's and the driving circuits Dr's to actuate them. Assuming that the decoded information "1" is given only to the switching circuit $Sw_2$ and the coded information "0" to the remaining switching circuits, only the switching circuit $Sw_2$ is caused to operate and the second unit memory board $M_2$ of the semi-fixed memory device HM is selected out to hold the conductor $l_2$ in FIG. 5 at a low potential. On the other hand, assuming that the decoded information "1" is given only to the the driving circuits $Dr_2$ and the coded information "0" to the remaining driving circuit, only the driving circuit $Dr_2$ is caused to operate to hold the conductor $l_2'$ in FIG. 5 at a high potential. Accordingly, current will flow from the conductor $l_2$ to the conductor $l_2'$ through the word driving line $M_{22}$ to drive it. Thus the word driving line in the second line of the unit memory board $M_2$ will be actuated. In each of the twenty-five digit lines intersecting this word driving line $M_{2-2}$ is induced a voltage corresponding to the information "1" or "0" depending on whether there is the loop or not at the intersection. Each of these induced voltages are read into the memory register MR through the reading amplifier.

What I claim is:

1. A semi-fixed memory device comprising a plurality of unit memory boards each composed of a pair of printed wiring boards, one of said printed wiring boards having a plurality of digit lines and the other thereof having a plurality of printed word driving lines, said digit lines and said word driving lines being disposed relative to each other at substantially right angle and said word driving lines being provided with a plurality of loops selectively cut to form either a loop portion or a short-circuiting line strip, shielding means provided between said unit memory boards, driving circuit means operatively connected with respective word driving lines, first and second address information means including address registers and address decoders, said driving circuit means being operatively connected with one of said address information means, switching circuit means operatively connecting the other address information means with the word driving lines to enable the driving circuit means to drive the word driving line selected by said switching means, and reading amplifier means operatively connected to said digit lines.

2. A semi-fixed memory device according to claim 1, further comprising control means for controlling said driving circuit means and said switching circuit means.

References Cited by the Examiner

UNITED STATES PATENTS

| | | | |
|---|---|---|---|
| 2,909,592 | 10/1959 | Morris et al. | 178—5.1 |
| 3,061,821 | 10/1962 | Gribble | 340—173 |
| 3,069,665 | 12/1962 | Bobeck | 340—174 |
| 3,098,996 | 7/1963 | Kretzmer | 340—173 |
| 3,130,388 | 4/1964 | Renard | 340—173 |

BERNARD KONICK, *Primary Examiner.*

IRVING SRAGOW, *Examiner.*

T. W. FEARS, R. G. LITTON, *Assistant Examiners.*